UNITED STATES PATENT OFFICE.

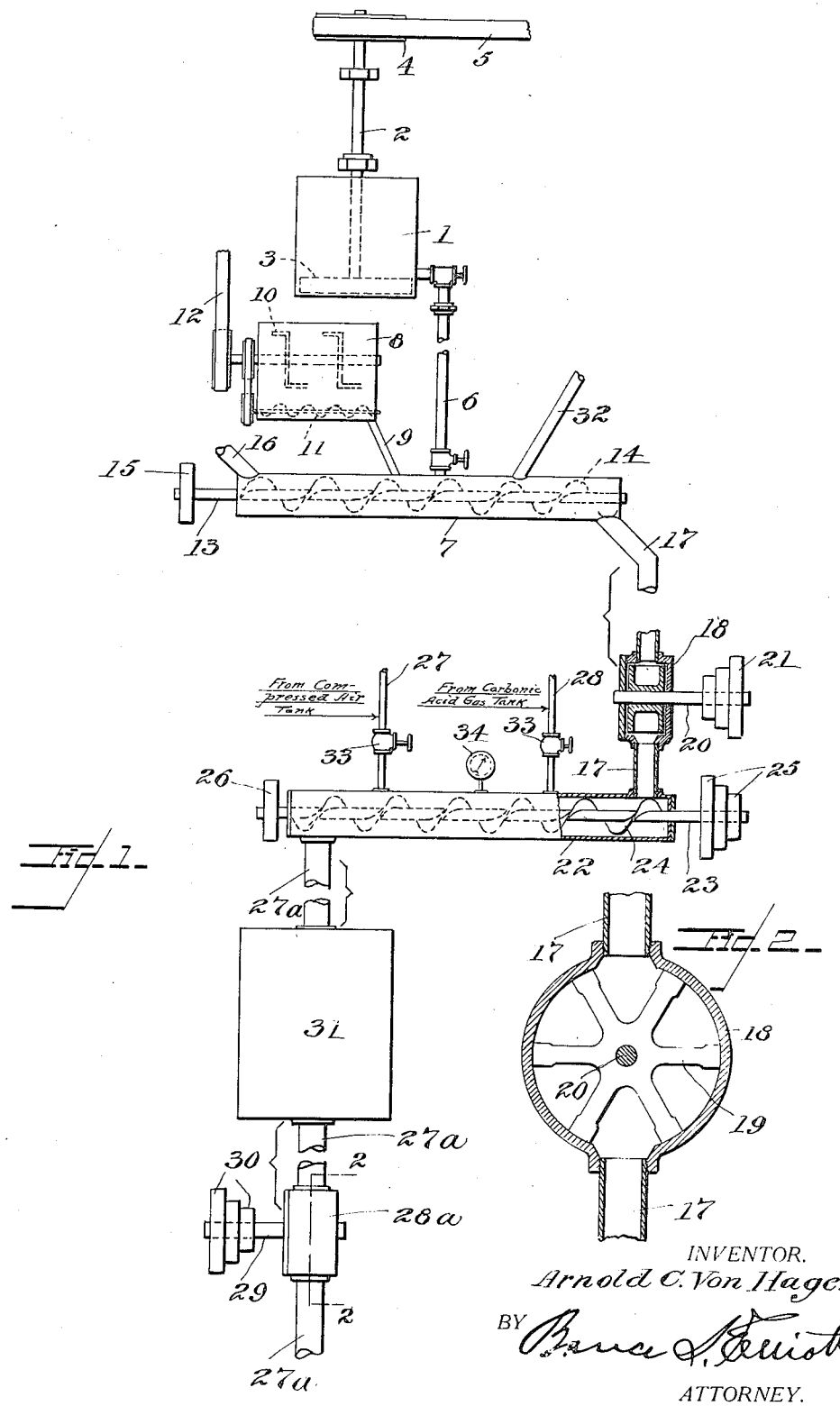

ARNOLD C. VON HAGEN, OF KANSAS CITY, MISSOURI.

METHOD OF TREATING WHEAT.

1,237,425.　　　Specification of Letters Patent.　　Patented Aug. 21, 1917.

Application filed September 1, 1916.　Serial No. 118,000.

*To all whom it may concern:*

Be it known that I, ARNOLD C. VON HAGEN, a citizen of the United States, residing in Kansas City, in the county of Jackson and State of Missouri, have invented new and useful Improvements in Methods of Treating Wheat, of which the following is a specification.

This invention relates to a novel method of treating grains, and more particularly wheat, to controllably supply moisture thereto and to improve the color of the flour content of the grain. My improved method may be practised independently of any other treatment, but preferably it is designed to follow as an added step in a continuous process the treatment of the grain with an alkaline substance, or a hypochlorite, or both, to sterilize, clean and purify the same in the manner set forth in an application for patent filed of even date herewith.

In my experience with the application of chlorinated lime or hypochlorite water to grain I have found that a material improvement in the color of the flour made from the grain may be obtained. I discovered, however, that the improvement in the color was not so marked as desired, due to the fact that the chlorin gas of the hypochlorite solution was not liberated in sufficient quantity to produce the desired result. By subsequent experiments I found that after treating the wheat with the hypochlorite solution that if the wheat, while still in its moistened condition, were subjected to the action of carbonic acid gas that practically all of the chlorin gas would be liberated and that the bleaching action upon the flour was greatly enhanced.

The main object of my invention is to cause a thorough permeation of moisture, and specifically the moisture of a hypochlorite solution into the grain by subjecting the grain during treatment therewith to pressure. In the preferred embodiment of my invention I combine with this treatment the addition of carbonic acid gas to the grain which has previously been treated with a hypochlorite solution, which carbonic acid gas operates to liberate the chlorin from the solution. This treatment is of course effected in a closed container, and after the introduction of the carbonic acid gas I admit compressed air to the container until I obtain a pressure sufficient to force the moisture and the chlorin gas into the grain.

It is often quite desirable to increase the moisture content of the grain not only to facilitate the grinding thereof and the proper separation of the bran and fiber from the flour, but also to bring the moisture content of the flour itself up to normal. This result is readily and expeditiously obtained by the use of pressure to cause the moisture to permeate through the shell into the kernel of the grain. It is of course understood that where the moisture content of the grain is normal, or above normal, as frequently occurs in wet seasons, the amount of moisture supplied to the grain would be regulated accordingly.

Coincident with such treatment the chlorin content of the solution in the form either of gas or chlorin water is caused to permeate the berry and to materially improve the color of the flour content thereof, making the same whiter.

In case the grain had been previously treated with lime and hypochlorite, as in my application referred to, and subsequently subjected to pressure as above described, the undissolved portions of the lime and the hypochlorite would be forced by the pressure on to the outer side of the wheat or other grain, and would remain there to exert their sterilizing and purifying action while the water from the solution and the chlorin gas liberated by the carbonic acid gas would be forced into the wheat or grain, with the effects alluded to. Furthermore, the employment of pressure forces the lime and hypochlorite solution not only into close contact with the exterior of the grain, but also causes it to enter any crevices or indentures in the grain so that it insures the absolute sterilization and purification of the grain which would otherwise not be so complete.

In case the wheat possesses an unpleasant odor, such as ground smell, or the odor arising from must, smut, or from any other cause or condition, by increasing the proportion of lime to which it is treated, as outlined in my other application aforesaid, not only may the acid content of the wheat be reduced, but the abnormal or foreign odor or odors in the wheat may be completely destroyed. By the combined process, therefore, that is, by treating the wheat with lime and hypochlorite solution, and then to pressure, which may be employed with or without the additional step of subjecting the grain to the action of carbonic acid gas, it will be apparent from the above that I am able to control the three factors of moisture, color and acidity, besides sterilizing the grain and purifying the same in the respects of removing, or facilitating the removal, of foreign matter arising from contamination or disease, and in destroying unpleasant or abnormal odors.

In order that my invention and the method of practising the same may be more readily understood I have illustrated in the accompanying drawing a system of apparatus for practising it.

In said drawing—

Figure 1 is a diagrammatical view illustrating an arrangement of apparatus for carrying out my improved method of treating wheat or other grain; and Fig. 2 is a longitudinal sectional view, on an enlarged scale, illustrating one of two similar valves for controlling, respectively, the entrance of grain into the treating chamber and its discharge therefrom, the section being taken on the line 2—2 of Fig. 1.

Referring now to the drawing, the numeral 1 indicates a tank for containing a hypochlorite solution into which extends a shaft 2 having on its lower end a paddle 3 and at its upper end a pulley 4 driven by a belt 5, whereby the solution may be continuously agitated. The numeral 6 indicates a valve pipe leading from the tank 1 to a cylinder 7. The numeral 8 indicates a container for lime from the lower end of which a pipe 9 leads to and communicates with the cylinder 7. The container 8 is preferably provided with agitators 10, and a worm feed 11 driven through suitable connections from a main driving belt 12, whereby the lime is agitated and at the same time continuously fed to the conduit 9 to be delivered into the cylinder 7. The cylinder 7 has extending centrally through it and mounted in its opposite ends a shaft 13, carrying a worm feed 14 and driven by a belt (not shown) from the pulley 15. The numeral 16 indicates a spout for feeding wheat into the cylinder 7, and the numeral 17 a similar spout for permitting the discharge of wheat from the cylinder. Interposed in the length of the discharge spout 17 is a valve casing 18 in which operates a cup or pocket valve 19, shown on an enlarged scale in Fig. 2, which valve is mounted on a shaft 20, adapted to be driven by one or the other of a series of pulleys 21. Beyond the valve casing 18 the spout 17 communicates with a cylinder 22 at one end thereof. Extending through the cylinder 22, and mounted in opposite ends thereof, is a shaft 23 having a worm feed 24 mounted thereon, and being provided at one end with a series of pulleys 25 arranged in inverse order as to size with respect to the pulleys 21, and which are adapted to drive said latter pulleys by means of a suitable belt (not shown) passed over one or the other of said sets of pulleys, according to the speed of rotation desired. At its opposite end the shaft 23 is provided with a drive pulley 26. The numeral 27 indicates a valve pipe leading from a compressed air tank or other source of compressed air, and communicating with the cylinder 22, and the numeral 28 indicates a similar pipe leading from a carbonic acid gas tank and communicating with the cylinder 22. At the opposite end of the cylinder 22 from that with which the spout 17 connects a discharge spout 27ª leads from said cylinder, and has interposed in its length a valve casing 28ª containing a valve similar to that shown in Fig. 2 mounted on a shaft 29 provided with pulleys 30 for permitting the shaft to be driven at different speeds.

Between the valve casing 28ª and the cylinder 22 I may interpose in the length of the discharge spout 27ª a tank 31 for prolonging the treatment of the wheat if the time required for it to pass through the cylinder 22 should not, in any given case, prove sufficient.

In practising my improved method, the alkali in the form of lime is fed into the cylinder 7 and mixed with the wheat, also fed into said cylinder through the spout 16, and a solution of an element of the halogen group, preferably a hypochlorite solution from tank 1 is allowed to flow into the cylinder 7 through the pipe 6 in regulated quantities to moisten the lime and the wheat. If the hypochlorite solution used is not sufficient to moisten the wheat to the extent desired, more moisture may be admitted to the cylinder 7 through a pipe 32. The wheat thus treated first with the lime and hypochlorite solution is thoroughly agitated by the worm feed 14, and is continuously fed by said worm feed to the discharge spout 17, and entering the chamber 18 is fed in regulated quantities by the valve 19 into the cylinder 24. If it is simply desired to raise the moisture content of the grain kernel, moisture alone should be applied to the grain. By adjusting a valve 33 any desired quantity of carbonic acid gas may be admitted into the cylinder 22, which operates to liberate chlorin from the hypochlorite solution. The operation of forcing the solution or the moisture into the grain is a separate operation, as follows: By adjusting a valve 33 compressed air is admitted into the cylinder 22 to place the wheat and gases therein under pressure, the extent of which is shown by a gage 34. The moisture of the water or the hypochlorite solution, by reason of the high pressure in the confining chamber or cylinder 7, is forced through the shell of the grain and into the interior or kernel of the grain. The hypochlorite solution has a very beneficial germicidal action, operating to thoroughly sterilize the grain. The wheat under pressure passes out through the discharge spout 27ª and, if desired, into a tank 31 subject to the pressure of the cylinder 22 to prolong the treatment, and finally is discharged by the valve in the casing 28ª, and conveyed by the discharge spout 27ª for subsequent cleaning operations to suitable machines for that purpose.

I claim:

1. The process which consists in treating grain first by subjecting the same to moisture, then agitating the grain to distribute the moisture over the shells of the grain, and then by a separate operation forcing the moisture into the shell of the grain by pressure.

2. The process which consists in treating grain by moistening the same with a hypochlorite solution, agitating the grain to distribute the moisture on the shells of the grain, and then subjecting the grain to pressure to force the said solution into the shell of the grain.

3. The process which consists in treating grain by moistening the same with a hypochlorite solution, then confining the grain and subjecting the grain to the action of carbonic acid gas, and then subjecting the grain to air pressure to force the solution through the shell of the grain.

4. The process which consists in cleaning and sterilizing grain by adding an alkali and a hypochlorite solution thereto, and then subjecting the grain to pressure to force the said solution through the shell of the grain.

5. The process which consists in cleaning and sterilizing grain by adding lime and hypochlorite solution thereto, confining the grain and subjecting it to the action of carbonic acid gas, and finally placing the same under pressure to force the solution through the shell of the grain.

6. The process which consists in cleaning and sterilizing grain by placing the grain in a container in the presence of an element of the halogen group, and then subjecting the grain to air pressure to force the said element through the shell of the grain.

7. The process which consists in cleaning and sterilizing grain by placing the grain in a container in the presence of chlorin and then subjecting the grain to air pressure to force the chlorin through the shell of the grain.

8. The process which consists in forcing a bleaching agent through the shell of grain and into the interior of the grain by air pressure.

9. The process which consists in applying moisture to grain and then forcing the moisture by air pressure through the shell of the grain into the interior of the grain.

10. The process which consists in concurrently forcing moisture and a bleaching agent through the shell of grain and into the interior of the grain by air pressure.

In testimony whereof, I have hereunto set my hand.

ARNOLD C. VON HAGEN.